United States Patent [19]

Rodney

[11] Patent Number: 6,151,554
[45] Date of Patent: Nov. 21, 2000

[54] METHOD AND APPARATUS FOR COMPUTING DRILL BIT VIBRATION POWER SPECTRAL DENSITY

[75] Inventor: Paul F. Rodney, Spring, Tex.

[73] Assignee: Dresser Industries, Inc., Dallas, Tex.

[21] Appl. No.: 09/289,933

[22] Filed: Apr. 12, 1999

Related U.S. Application Data

[60] Provisional application No. 60/091,031, Jun. 29, 1998.

[51] Int. Cl.$^7$ ....................................................... G01V 1/50
[52] U.S. Cl. ................................................ 702/9; 702/17
[58] Field of Search ................................... 702/9, 14, 17; 367/25, 40, 75, 82; 175/45; 73/152.03

[56] References Cited

U.S. PATENT DOCUMENTS

| 2,620,386 | 12/1952 | Alspaugh et al. | 177/311 |
|---|---|---|---|
| 4,172,250 | 10/1979 | Guignard | 367/27 |
| 4,363,112 | 12/1982 | Widrow | 367/30 |
| 4,365,322 | 12/1982 | Widrow | 367/32 |
| 4,829,489 | 5/1989 | Rector | 367/82 |
| 4,849,945 | 7/1989 | Widrow | 367/30 |
| 4,862,423 | 8/1989 | Rector | 367/25 |
| 4,926,391 | 5/1990 | Rector et al. | 367/41 |
| 4,954,998 | 9/1990 | Rector | 367/82 |
| 4,964,087 | 10/1990 | Widrow | 367/45 |
| 4,965,774 | 10/1990 | Ng et al. | 367/75 |
| 5,050,130 | 9/1991 | Rector et al. | 367/41 |
| 5,109,947 | 5/1992 | Rector, III | 181/106 |
| 5,130,951 | 7/1992 | Kingman | 367/82 |
| 5,138,875 | 8/1992 | Booer | 73/151 |
| 5,148,407 | 9/1992 | Haldorsen et al. | 367/32 |
| 5,151,882 | 9/1992 | Kingman | 367/82 |
| 5,191,557 | 3/1993 | Rector et al. | 367/41 |
| 5,222,048 | 6/1993 | Grosso et al. | 367/32 |
| 5,303,203 | 4/1994 | Kingman | 367/75 |
| 5,511,038 | 4/1996 | Angeleri et al. | 367/40 |
| 5,555,530 | 9/1996 | Meehan | 367/45 |
| 5,721,376 | 2/1998 | Pavone et al. | 73/152.47 |

FOREIGN PATENT DOCUMENTS

| 0 780 702 A1 | 6/1997 | European Pat. Off. | 1/40 |
|---|---|---|---|
| 2 700 018 | 12/1992 | France | 1/40 |
| 2273984 | 7/1994 | United Kingdom | 1/35 |
| 2282664 | 4/1995 | United Kingdom | 1/52 |
| WO 92/02833 | 2/1992 | WIPO | 1/28 |
| WO 96/18118 | 6/1996 | WIPO | 1/40 |

OTHER PUBLICATIONS

Booer, A.K., et al. "Drillstring Imaging—An Interpretation of Surface Drilling Vibrations." SPE Drilling & Completion, Jun. 1993, pp. 93–98.

Jackson, et al. "Seismic While Drilling: Operational Experiences in Vietnam." World Oil, Mar. 1997, pp. 50–53.

Kamata et al. "Real–Time Seismic–While–Drilling Offers Savings, Improves Safety." Hart's Petroleum Eng'r Int'l, Oct. 1997, pp. 37–39.

Khaled et al. "Seismic–While–Drilling in Kuwait Results and Applications." GeoArabia, vol. 1, No. 4, 1996, Gulf PetroLink, Bahrain, pp. 531–550.

Meehan, Richard et al. "Rekindling Interest in Seismic While Drilling." Oilfield Review, Jan. 1993, pp. 4–13.

Miranda et al. "Impact of the Seismic 'While Drilling' Technique on Exploration Wells." First Break, vol. 14, No. 2, Feb. 1996, pp. 55–68.

Naville, et al. "Well Seismic—Application of the TRAFOR MWD System to the Drill Bit Seismic Profiling." EAEG—56th Meeting and Techn. Exh., Vienna, Jun. 1994, 2 pages.

Poletto, Flavio, et al. "Seismic While Drilling Using PDC Signals—Seisbit Experience and Perspectives." EAGE 59th Conference and Technical Exhibition—Geneva, Switzerland, May 26–30, 1997, 2 pp.

(List continued on next page.)

Primary Examiner—Donald E. McElheny, Jr.
Attorney, Agent, or Firm—Howard L. Speight

[57] ABSTRACT

A power spectrum density processor is located near the drill bit while drilling. The power spectral density processor computes the power spectral density of the vibrations generated by the drill bit while drilling. The power spectral density information is telemetered to the surface where it is used to enhance drill bit seismic techniques.

24 Claims, 3 Drawing Sheets

OTHER PUBLICATIONS

Rector, James, "Noise Characterisation and Attenuation in Drill Bit Recordings." Journal of Seismic Exploration, 1992, pp. 379–393.

Rector, James. III, et al. "Radiation Pattern and Seismic Waves Generated by a Working Roller–Cone Drill Bit." Geophysics, vol. 57, No. 10, Oct. 1992, pp. 1319–1333.

Rector, J.W., III, et al. "The Use of Drill–Bit Energy as a Downhole Seismic Source." Geophysics, vol. 56, No. 5, May 1991, pp. 628–634.

Ulrych et al. "Analytic Minimum Entropy Deconvolution." Geophysics, vol. 47, No. 9, Sep. 1982.

Ulrych et al. "Autoregressive Recovery of the Acoustic Impedance." Geophysics, vol. 48, No. 10, Oct. 1983.

Drumheller, Douglas S. "Acoustical Properties of Drill Strings." The Journal of the Acoustical Society of America, Mar. 1989, No. 3, New York, pp. 1048–1064.

Drumheller, Douglas S., et al. "The Propagation of Sound Waves in Drill Strings." The Journal of the Acoustical Society of America. Apr. 1995, No. 4, Woodbury, NY, pp. 2116–2125.

Harrison, A.R., et al. "Acquisition and Analysis of Sonic Waveforms From a Borehole Monopole and Dipole Source for the Determination of Compressional and Shear Speeds and Their Relation to Rock Mechanical Properties and Surface Seismic Data." 65th Annual Technical Conference and Exhibition of the Society of Petroleum Engineers, New Orleans, LA, Sep. 23–26, 1990. Society of Petroleum Engineers, Copyright 1990, pp. 267–282.

METHOD AND APPARATUS FOR COMPUTING DRILL BIT VIBRATION POWER SPECTRAL DENSITY

This application claims priority based on the provisional application entitled "Method and Apparatus for Computing Drill Bit Vibration Power Spectral Density" having provisional Ser. No. 60/091,031 filed Jun. 29. 1998. The aforementioned provisional application is hereby incorporated in its entirety by reference.

FIELD OF THE INVENTION

This invention relates to collection of data from the earth using seismic measurements and more particularly computation at a drill bit of the power spectral density of vibrations generated by the drill bit during drilling.

BACKGROUND OF THE INVENTION

Conventional seismic technology uses surface sources of seismic energy and surface receivers to detect reflections from underground geologic formations such as layers and faults. The collected seismic data can be used to locate the underground formations and guide drilling operations to sources of hydrocarbons.

In Vertical Seismic Profiling ("VSP"), drilling operations are interrupted to place a series of seismic sensors at discrete depths in a borehole being drilled. A surface source releases energy that is reflected off underground geologic formations. The seismic sensors in the borehole sense the reflected energy and provide signals representing the reflections to the surface for analysis. The seismic data is used in analysis of the geology of the earth near the borehole.

In a subsequent development, known as "drill bit seismics", seismic sensors were positioned at the surface near the borehole to sense seismic energy imparted to the earth by the drill bit during drilling. The sensed energy was used in the traditional seismic way to detect reflections from underground geologic formations. Further, this technique was used to detect "shadows", or reduced seismic energy magnitude, caused by underground formations, such as gas reservoirs, between the drill bit and the surface sensors.

Analysis of drill bit seismic data entails determining the amount of time between the generation of the seismic energy by the drill bit and the detection of the seismic energy. This can be accomplished by using a "pilot sensor" near the top of the drillstring to which the drill bit is attached. The pilot sensor detects the vibrations transmitted through the drillstring by the drill bit. Those vibrations, corrected and filtered to account for the delay and distortion caused by the drillstring, can be correlated with the seismic energy received at the surface sensor to determine the distance traveled by the seismic energy received at the surface sensors. With this information, the location of the underground formations can be determined.

Drill bit seismic techniques were originally applied to vertical and near-vertical wells where the drillstring is generally not in contact with the borehole. Contact between the drillstring and the borehole wall attenuates the drill bit signal received by the pilot sensor, modifies the drillstring transfer function, and causes spurious signals to be transmitted into the formation. Hence, drill bit seismics have not been effective under those conditions.

SUMMARY OF THE INVENTION

The invention improves drill bit seismic by computing at or near the drill bit the power spectral density of the vibrations of the drill bit. The computed power spectral density is telemetered to the surface where it is divided into the power spectral density measured at the pilot sensor to produce the magnitude of the drillstring transfer function. The computed power spectral density is also used to enhance correlation with drill bit seismic signals received by sensors on the surface.

In general, in one aspect, the invention features a drill bit seismic system. The drill bit seismic system comprises a downhole transducer sensitive to the vibrations of a drill bit. The drill bit is coupled to a drill string. The downhole transducer produces a downhole transducer signal representative of the vibrations of the drill bit. A downhole power spectral density processor is configured to compute the downhole power spectral density of the downhole transducer signal. The downhole transducer and the downhole power spectral density processor are located near the drill bit during drilling operations. A surface transducer, coupled to the drill string substantially at the surface, is sensitive to the vibrations in the drill string. The surface transducer produces a surface transducer signal representative of the vibrations in the drill string. A surface power spectral density processor is configured to compute the surface power spectral density of the surface transducer signal. A drill string transfer function magnitude estimator is configured to estimate the magnitude of the transfer function of the drill string from the drill bit to the surface using the downhole power spectral density and the surface power spectral density.

Implementations of the invention may include one or more of the following. The drill bit seismic system may further comprise a transmitter configured to transmit the power spectral density and a receiver configured to receive the transmitted power spectral density. The drill string transfer function estimator may be configured to estimate the magnitude of the drill string transfer function from the drill bit to the surface by dividing the surface power spectral density by the downhole power spectral density and taking the square root of the result.

The drill bit seismic system may further comprise a computer configured to use the estimated magnitude of the transfer function to improve an estimate of the transfer function. The downhole transducer may be sensitive to upgoing compressional wave energy. The downhole transducer may be sensitive to upgoing torsional wave energy.

The system may further comprise a seismic energy estimator configured to use the downhole power spectral density to provide an estimate of the power spectral density of the seismic energy generated by the bit. The seismic source signature estimator may be configured to use the estimated seismic energy generated by the bit to improve an estimate of the seismic source signature at the bit. The downhole power spectral density may be computed for samples taken of the downhole transducer signal within a specified time window. The specified time window may have a length no greater than an update rate of drill bit seismic processing. The downhole transducer may be sensitive to compressional wave energy traveling in a drill string to which the drill bit is attached.

The drill bit seismic system may further comprise one or more additional downhole transducers. One or more of the additional downhole transducers may be sensitive to compressional wave energy traveling in the drill string. Two or more downhole transducers sensitive to compressional wave energy may be configured to separate compressional wave energy traveling up the drill string from that travelling down the drill string. The power spectral density processor may be configured to compute the power spectral density of the compressional wave energy traveling up the drill string detected by the additional transducers.

The drill bit seismic system may further comprise a drill string transfer function phase estimator configured to estimate the phase of the transfer function of the drill string from the drill bit to the surface using the computed magnitude of the drill string transfer function. The drill string transfer function phase estimator estimates the phase of the transfer function using the following equation:

$$\theta(\omega_0) = \frac{\omega_0}{2\pi} \int_{-\infty}^{\infty} \frac{\alpha(\omega)}{\omega^2 - \omega_0^2} d\omega;$$

where
$\omega$=frequency;
$\alpha(\omega)=-\ln(|H(\omega)|)$;
$|H(\omega)|$=the magnitude of the transfer function; and
$\theta(\omega_o)$=the phase of the transfer function at $\omega_0$.

The drill bit seismic system may further comprise a downhole clock located near the drill bit. The downhole clock may be configured to produce a downhole clock trigger and a downhole time signal representing the time the downhole clock trigger was produced. The system may further comprise a downhole sampler coupled to the downhole transducer signal and to the downhole clock trigger, the downhole sampler may be configured to take a predetermined number of downhole samples upon receipt of the downhole clock trigger. The system may include a surface clock substantially synchronized with the downhole clock and a surface sampler coupled to the surface transducer signal. The surface sampler may be configured to take surface samples of the surface transducer signal. The system may include a phase detector coupled to the downhole samples, the downhole time signal and the downhole power spectral density. The phase detector may be configured to determine a phase of the surface signal at the same frequencies at which the phase was determined downhole. The system may include a transmitter configured to transmit the phase determined downhole and the time at which the downhole signal used in the phase calculation was measured. The system may include a transfer function phase calculator configured to calculate the phase of the transfer function between the drill bit and the surface sensors at the selected frequencies by subtracting the phases determined at the surface from those determined downhole at each frequency.

The drill bit seismic system may further comprise a downhole clock located near the drill bit. The downhole clock may be configured to produce a downhole clock trigger and a time signal representing the time the downhole clock trigger was produced. A downhole sampler may be coupled to the downhole transducer signal and to the downhole clock trigger. The downhole sampler may be configured to take a predetermined number of downhole samples upon receipt of the downhole clock trigger. The system may include a surface clock substantially synchronized with the downhole clock. A surface sampler may be coupled to the surface transducer signal and may be configured to take surface samples of the surface transducer signal. The system may include an estimator configured to estimate the time it takes for signals to propagate from the bit to the surface sensors. The system may include a phase detector coupled to the downhole samples, the downhole time signal and the downhole power spectral density. The phase detector may be configured to determine the phase of the downhole signal at at least one frequency of interest. The system may include a phase detector coupled to the surface clock, the surface samples and the estimator. The phase detector may be configured to determine the phase of the surface signal at the same frequencies at which the phase was determined downhole. A transfer function phase calculator may be configured to calculate the phase of the transfer function between the drill bit and the surface sensors at the selected frequencies as a function of the phases determined downhole, the phase determined at the surface and the estimated propagation time from the bit to the surface sensors.

The estimator may comprise a calculator configured to calculate the group delay from the magnitude of the transfer function between the downhole sensors and the surface sensors.

In general, in another aspect, the invention features a drill bit seismic system. The drill bit seismic system comprises a drill bit coupled to a drill string. A drill string transfer function estimator is configured to estimate a drill string transfer function magnitude by computing a downhole power spectral density of a signal representative of the vibrations of the drill bit and a surface power spectral density of a signal representative of the vibrations of the drill string substantially at the surface. A lateral motion transducer is coupled to the drill string near the drill bit. The lateral motion transducer is sensitive to lateral motion of the drill bit and produces a lateral motion transducer signal. The lateral motion transducer signal is coupled to the drill string transfer function estimator. The drill string transfer function estimator is configured to filter the effects of the lateral motion of the drill bit on the estimate of the transfer function of the drill string.

Implementations of the invention may include one or more of the following. The drill string transfer function estimator may be configured to stop estimating the transfer function of the drill string when the lateral motion transducer signal is greater than a predetermined amount.

In general, the invention features a method for using drill bit vibration spectral density in a drill bit seismics system. The method comprises sensing drill bit vibrations and computing the drill bit power spectral density of the sensed drill bit vibrations. The method further comprises sensing vibrations in the drill string at the surface and computing the surface power spectral density of the sensed drill string vibrations. The method further comprises estimating a transfer function of the drill string using the drill bit power spectral density and the surface power spectral density.

Implementations of the invention may include one or more of the following. The method may comprise estimating the phase of the transfer function of the drill string using a downhole clock and a surface clock substantially synchronized with the downhole clock.

DESCRIPTION OF THE PREFERRED EMBODIMENTS

Figure 1:
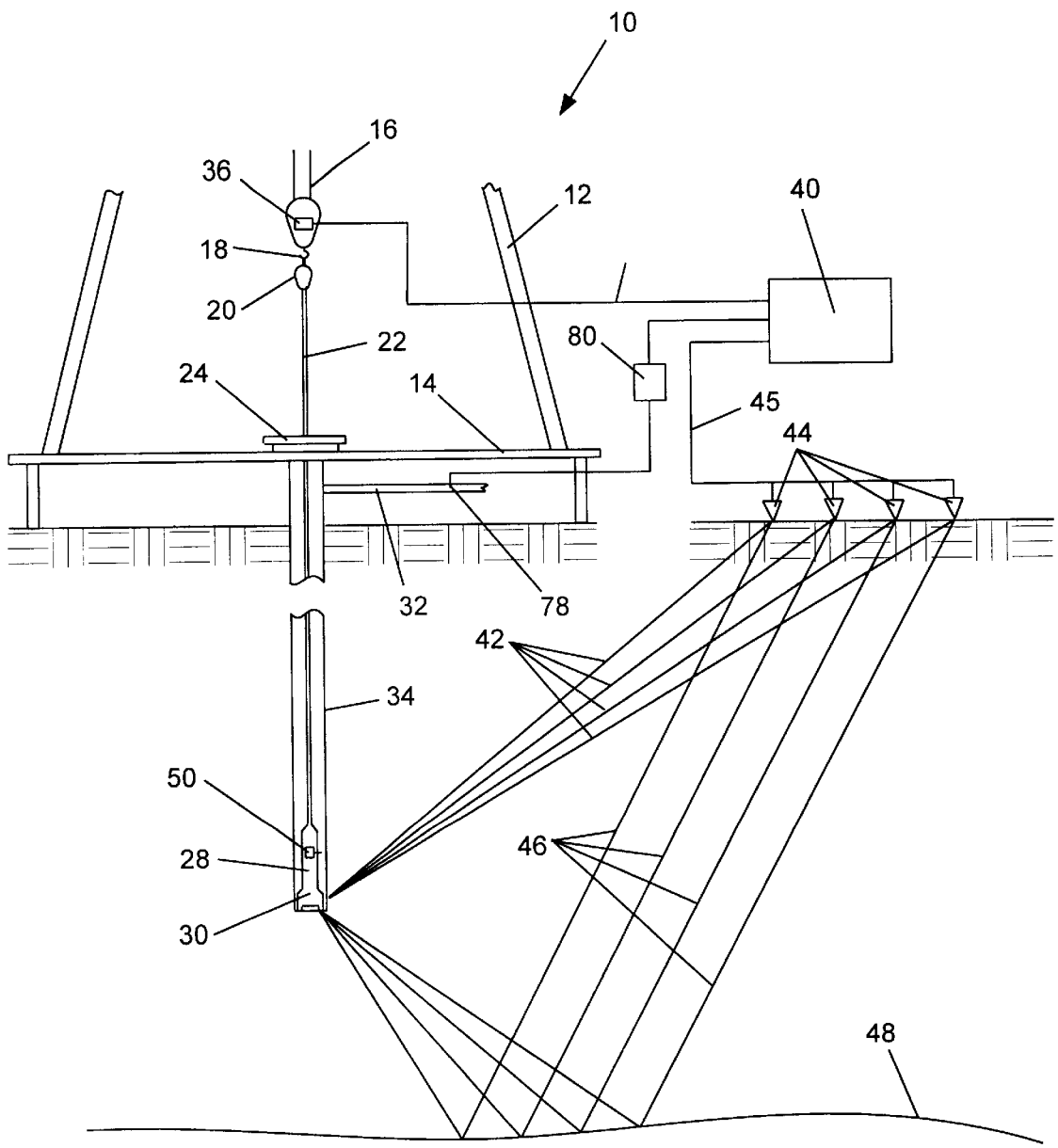
FIG. 1 is a cross-section view of a drilling operation.

A drilling rig 10 (simplified to exclude items not important to this application) comprises a derrick 12, derrick floor 14, draw works 16, hook 18, swivel 20, kelly joint 22, rotary table 24, drillstring 26, drill collars 28 and drill bit 30, as shown in FIG. 1. Mud is injected into the swivel by a mud supply line (not shown). The mud travels through the kelly joint 22, drillstring 26 and drill collars 28 and exits through ports in the drill bit 30. The mud then flows up the borehole 34. A mud return line returns mud from the borehole and circulates it to a mud pit and back to the mud supply line.

Vibrations caused by the drill bit cause the drill collars 28, drillstring 26, kelly joint 22, swivel 20, hook 18 and draw works 16 to vibrate. A pilot sensor 36 coupled to the draw works 16 detects the vibration of the draw works 16 and generates a "pilot signal" which is transmitted by wire 38 to a signal processor 40. The pilot signal is advanced in time to account for the time required for the vibrations to travel from the drill bit 30 to the draw works 16 and filtered to account for the distortions caused by its transmission through the intervening drill collars 28, drillstring 26, kelly joint 22, swivel 20, and hook 18. The time correction and filtering are used to attempt to simulate measuring the vibrations of the drill bit at the location of the drill bit rather than at the draw works. Both the time correction and the filtering require knowledge of the transmissibility of the drillstring to the vibrations generated by the drill bit.

In addition to traveling up the drillstring, the vibrations of the drill bit are imparted to the earth. The seismic energy generated by the drill bit follows direct paths 42 to surface sensors 44. Surface sensors 44 create "surface sensor signals" which are transmitted to the signal processor 40 by wire 45.

Seismic energy generated by the drill bit also follows reflective paths 46 to underground formation 48, where the seismic energy reflects and travels to the surface where it is detected by surface sensors 44.

The signal processor analyzes the pilot signal and the surface sensor signals in known ways to estimate the location of the underground formation 48. With the pilot sensor 36 and the surface sensors 44 being above ground, it is necessary to estimate the signature of the acoustic source (the drill bit) and the transmissibility of the earth and the drillstring.

The analysis of the pilot sensor signal and the surface sensor signals includes the correlation of the pilot signal with the surface sensor signals. If a frequency component of the vibrations generated by the drill bit is lost the correlation between the time-corrected, filtered pilot sensor signal and the surface sensor signals will be less likely to produce the desired result. A frequency component could be lost because of the distortion caused by the drillstring or the pilot sensor signal filter could cause it. Further, the pilot sensor signal can be completely lost in highly inclined wells where the drillstring contacts the borehole and damps out the acoustic waves propagating to the surface through the drillstring.

Further, drill bit seismics have generally been used with roller cone bits, which have the characteristic of generating the necessary acoustic waves. In contrast, Polycrystalline Diamond ("PDC") bits generate energy in the form of shear waves and thus are considered to be "quiet" compared to roller cone bits. The existing drill bit seismic techniques are less likely to work with PDC bits.

The invention solves these problems by measuring, while drilling, at or near the drill bit, one or more types of drill bit generated noises to produce drill bit signals. The drill bit signals are processed at or near the drill bit (i.e. "downhole") in such a way as to extract information from them which can be used to improve the knowledge of the transmissibility of the drillstring and/or of the signal which has been transmitted by the bit into the formation over the knowledge obtained with conventional drill bit seismic technologies. The processing is done in such a way that a large amount of information is compressed into a sufficiently small amount of data that the information can be transmitted in real time to the surface by a mud pulse telemetry system (or other low data rate telemetry system). When received at the surface, these data are used to improve the knowledge of the drillstring transmissibility and of the general features of the energy generated at the bit, both of which are used in interpreting drillstring seismics.

Figure 2:
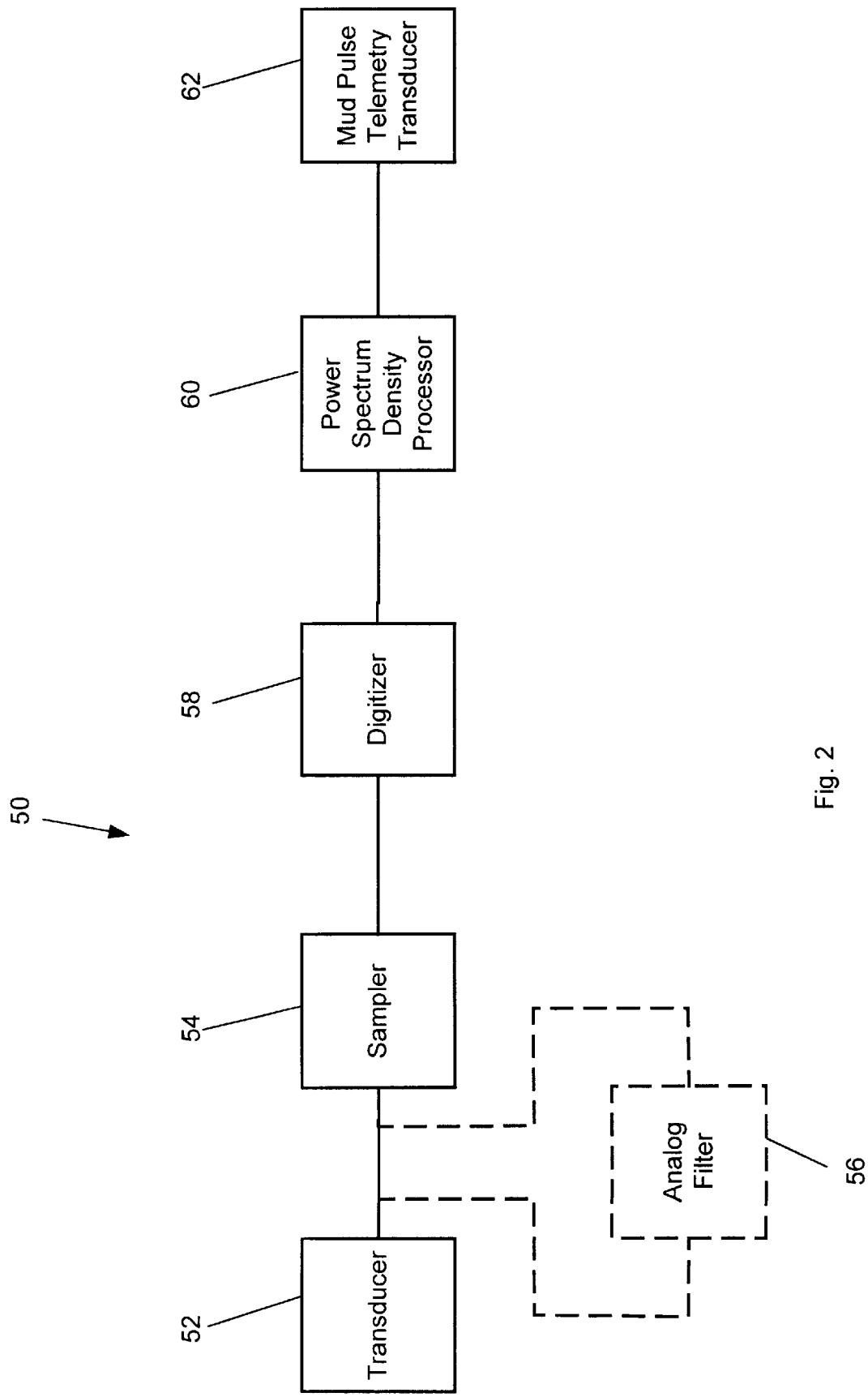
FIG. 2 is a block diagram according to the present invention.

In the preferred embodiment, compressional waves generated by the bit are measured downhole near the bit for a period of time (about five minutes) and processed by a downhole processor 50, as shown in FIG. 1. The downhole processor, illustrated in FIG. 2, comprises a transducer 52, which converts the compression waves to an electric transducer signal, and a sampler 54, which samples the transducer signal at a sufficient rate that none of the drill bit noise is aliased, preferably at a sample rate of 1 KHz. Alternatively, since signals with energy above about 50 Hz do not propagate well to the surface, an analog low pass filter 56 can be used to limit the transducer signal to 100 Hz prior to sampling. If the filter is used, a sampling rate of 200 Hz will be sufficient. The sampled signal is then digitized by a digitizer 58 and provided to a power spectral density processor 60. The power spectral density processor 60 performs the processing described below and then provides a telemetry signal to a mud pulse telemetry transmitter 62 for transmission through the drilling mud to the surface.

Now the processing performed by the power spectral density processor 60 is described. As is well known in the art, there are a number of ways of determining the transfer function (i.e. the ratio of the output to the input at a fixed frequency) of a linear system. One way is to simply measure the output amplitude and phase vs. the input amplitude referenced to zero phase at each of a large number of frequencies.

If only the magnitude of the transfer function is desired, then the input to the system can be stimulated with a noise having spectral components covering all frequencies of interest, and the magnitude of the transfer function can be determined using the relationship:

$$S_{yy}(\omega) = S_{xx}(\omega) \cdot |H(\omega)|^2$$

Where $S_{xx}(\omega)$ is the power spectral density of the input of the system $S_{yy}(\omega)$ is the power spectral density of the output of the system And $H(\omega)$ is the transfer function of the system By definition, the "power spectral density" of a process is the Fourier transform of the autocorrelation of that process:

$$S_{xx}(\omega) = \int_{-\infty}^{\infty} e^{-j\omega\tau} R_{xx}(\tau) d\tau$$

and $$R_{xx}(\tau) = E(x(t) \cdot x(t+\tau))$$

E( ) refers to the expectation value.

Implicit in the above statements are the assumptions that the process is stationary and ergodic.

Figure 3:
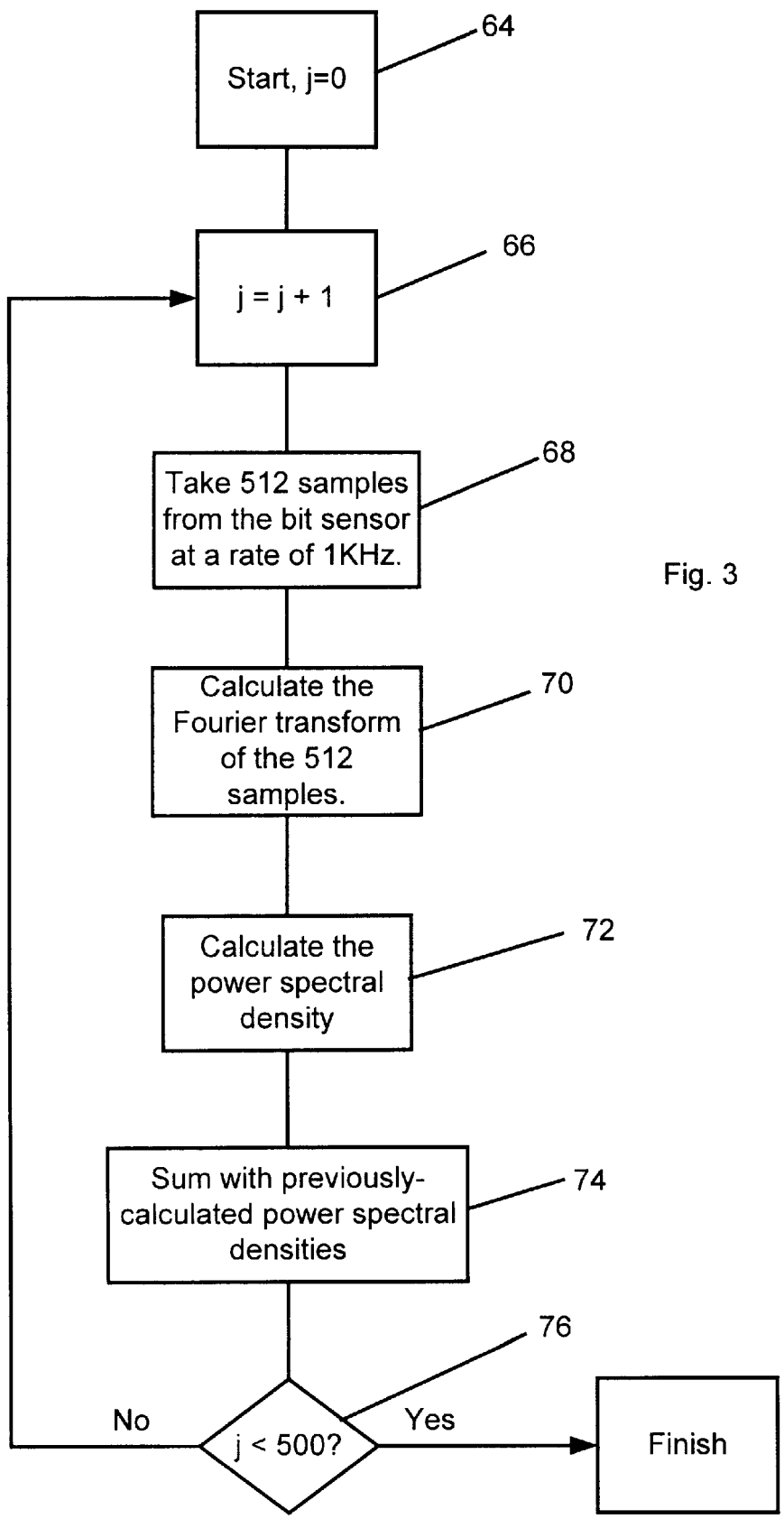
FIG. 3 is a flow chart according to the present invention.

As discussed above, in the preferred embodiment, the magnitude of the transfer function of the drillstring is determined by calculating the power spectrum of the signal generated at the bit, transmitting the portion of this power spectrum which is relevant to seismics to the surface, and dividing it into the power spectrum observed by a pilot sensor. The following procedure, illustrated in FIG. 3, can be followed to determine the power spectrum of the signal generated at the bit (a similar procedure is followed to determine the power spectrum of the signal received by a pilot sensor):

Start j←0[64, FIG. 3]

Total$_k$←0, k=1, 2, . . . 256 Total$_k$ is an array which will be used in computing the power spectral density Increment j: j=j+1, j defines a time interval [66]

Take 512 samples of the signal from the bit sensor at a rate of 1 KHz [68].

Denote these as $x_i$, i=1, 2, . . . 512

Calculate the Fourier transform of $x_i$[70],denote this as $X_k$, k=0, 1, . . . 256

Calculate the power spectral density, $S_k$ at frequency k for time interval j [72] $s_k = X_k \cdot \overline{X}_k$ where $\overline{X}_k$ is the complex conjugate of $\overline{X}_k$ Sum this with the previous power spectral densities [74]

$$\text{Total}_k \rightarrow \text{Total}_k + S_k$$

If j<500, then return to "Increment j" [76]; otherwise, end.

The final array Total$_k$ contains an estimator of the power spectrum of the signal generated at the bit (scaled by a factor of 500; the resealing can be done downhole or at the surface).

In the above process, note that while each group of 512 samples should be taken at precisely determined intervals (1 ms in the example given), there can be a variable delay between the updating of the array Total and the incrementing of j.

The 257 power spectral components obtained using the above technique cover a range of frequencies from 0 through 500 Hz, in increments of 1/0.512 Hz. The zero frequency term is of interest only as a quality check, while terms above about 100 Hz (terms above k=51) are of no interest to drill bit seismics. Thus, only 51 spectral terms are of interest. These terms can be telemetered to the surface in a relatively small amount of time. For example, assume the terms are represented logarithmically, with the characteristic specified to 4 bits and mantissa specified to 8 bits. Then a total of 612 bits must be transmitted to the surface. At a data rate of 2 bits per second, this can be accomplished in a little over 5 minutes.

Statistics can also be acquired to determine the degree to which stationarity and ergodicity hypotheses have been met. This could be accomplished by comparing successive power spectra from 5-minute intervals, or by comparing power spectra computed in shorter intervals, e.g. 2.5 minutes.

Data is not acquired during the pulse transmission period.

A mud telemetry transducer 78, illustrated in FIG. 1, receives the telemetry signal from the downhole processor 50 and transmits it to a mud telemetry receiver 80, which provides the received telemetry to the signal processor 40. When received at the surface, the power spectrum is used to determine at what frequencies signals were transmitted into the formation by the drill bit. If little energy was transmitted at certain frequencies, then little, if any, energy will be received at those frequencies by the surface sensors. In addition, when the power spectrum obtained by the pilot signal is divided by the power spectrum at the bit, the transmissibility between the bit and the point of reception of the pilot signal is known.

The estimated magnitude of the transfer function may be used to construct a reflection series, representative of the drillstring and discontinuities within the string. The power spectral seismic technique provides a better estimate of the magnitude of the transfer function from which to construct such a series. The improved estimated transfer function can then be used to provide a better estimate of the signal transmitted by the bit into the formation at any given time given what is received by the pilot sensors.

Further, the improved estimated transfer function makes it possible to better estimate the component of the drilling rig's motion that arises from bit motion. This component couples into the surface of the earth, causing surface waves to appear in the surface seismic array. These surface waves should be highly correlated with the bit signature itself and thus their presence complicates analysis of the seismic signals coming from beneath the surface. An improved knowledge of this component of the noise helps in filtering against it.

The phase of the transfer function can also be determined. The drillstring transfer function is generally thought to be a minimal phase function. In this case, the phase and log of the magnitude of the transfer function are related by Hilbert transforms. For example, it can be shown that if the transfer function is written in the form $$H(\omega) = e^{-\alpha(\omega) - j\theta(\omega)}$$

then $$\theta(\omega_0) = \frac{\omega_0}{2\pi} \int_{-\infty}^{\infty} \frac{\alpha(\omega)}{\omega^2 - \omega_0^2} d\omega.$$

In this expression, $\theta(\omega)$ is the phase, while $$\alpha(\omega) = -\ln(|H(\omega)|).$$

Note that the above integral is a Cauchy principal value integral and, as such, its evaluation is non-trivial. If the following assumptions are made:

$$\alpha(\omega) = A, \text{ for } |\omega| > \omega_c; \text{ and}$$

$$\alpha(\omega) = \sum_{n=0}^{M} a_n \omega^{2-n}, \text{ for} |\omega| < \omega_c;$$

(i.e. that $\alpha(\omega)$ is an even polynomial), then an evaluation of the integral will yield:

$$\theta(\omega_0) = \frac{1}{\pi} \cdot \ln\left(\left|\frac{\omega_c - \omega_0}{\omega_c + \omega_0}\right|\right) \cdot \left(A - \sum_{n=0}^{M} a_n \cdot \omega_0^{2n}\right) -$$

$$\frac{1}{\pi} \cdot \sum_{n=0}^{M} a_n \cdot$$

$$\left[\sum_{j=0}^{2 \cdot n - 1} \frac{(2 \cdot n)! \cdot \omega_0^j [(\omega_c - \omega_0)^{2n-j} - (\omega_c + \omega_0)^{2n-j} \cdot (-1)^j]}{(2 \cdot n - j)! \cdot j! \cdot (2n - j)}\right]$$

If it is further assumed that for $-\omega_c < \omega < \omega_c$, $\alpha(\omega) = \gamma|\omega|$, then evaluation of the integral yields:

$$\theta(\omega_0) = \frac{A}{\pi} \cdot \ln\left(\left|\frac{\omega_c + \omega_0}{\omega_c - \omega_0}\right|\right) - \frac{\omega_0 \cdot \gamma}{\pi} \cdot \ln\left[\left|1 - \left(\frac{\omega_c}{\omega_0}\right)^2\right|\right].$$

A useful approximation to the integral is derived in "Seismic Waves and Sources," by Ari Ben-Menahem and Sarva Jit Singh, Springer-Verlag, New York (1981) at 1055, for the case when $$\omega \cdot \frac{d}{d\omega}(\alpha(\omega))$$

is a slowly varying function of $\omega$:

$$\theta(\omega) = -\frac{\pi}{2} \cdot \omega \cdot \frac{d\alpha(\omega)}{d\omega}$$

where $A(\omega)$ is an all pass function such that $|A(\omega)|=1$. A simple example of such a function is $A(\omega)=e^{j\eta}$ for some constant $\eta$.

The power spectral seismic technique can be applied to both compressional and torsional waves traveling in the drillstring, both of which the prior art monitored only with sensors on the drilling rig. In addition, lateral waves can be monitored, although it is generally thought that lateral waves do not propagate to the surface from the drill bit.

It should also be noted that the motion of a given type (i.e. compressional, torsional or lateral) at a given point in the drillstring results from the superposition of upgoing and downgoing waves of that type. By suitably separating a pair of transducers along the drillstring and near the bit, upgoing and downgoing waves can be separated by means well known in the art. The power spectral technique can be applied to both or either of these components. Based on simulations with compressional waves, it appears there is very little difference between the spectral component of the upgoing waves near the bit and of the downgoing waves.

Additional information can be made available if a precise downhole clock is available. For seismic applications, a downhole clock synchronized with a surface clock to within 1 ms for the duration of the downhole mission is adequate. If a small portion of the signal is recorded beginning at a precisely defined time and transmitted to the surface, this can be used with the signals observed at the surface and the power spectral density observed downhole to determine the phase of the transfer function between the bit and the pilot sensor on the surface. This is preferably accomplished by monitoring a temporally isolated impulse near the bit. Such impulses generally occur as a part of the random motion of the bit. An arbitrary phase is then specified for the transfer function at all frequencies, the impulse recorded downhole is filtered using the approximate transfer function (determined from the magnitude of the transfer function and the estimated phase), and the phase at each frequency is iteratively adjusted so as to minimize the mean square difference between the filtered signal and the signal observed at the surface. Alternatively, in the case of compressional waves, the weight on bit can be suddenly modified to produce an isolated pulse.

Further, the phase estimate can be improved using the precise downhole clock if at least one phase value from one of the Fourier transforms used to construct the downhole power spectrum is available. Suppose, for example, that a Fourier transform is calculated for a time interval of length $\Gamma$ beginning at time T. The amplitude of the Fourier transform can be used to construct the power spectrum, as described earlier. In addition, suppose one phase value at a frequency $\omega_0$ of particular interest for seismic work, e.g. 25 Hz, is transmitted to the surface, along with the time T, marking the beginning of the interval for which this phase value is calculated. As will be described later, it is possible to make an estimate of the propagation time from downhole to the surface. Let this propagation time be $\tau$. The phase can also be calculated for an interval of width $\Gamma$ at time $T+\tau$ for all signals received at the surface because these signals are stored in a memory unit. $\Gamma$ should be greater than $\tau$ since it is desirable that the measurement interval at the surface be as free as possible of reverberations from signals generated at times less than T. The difference in the phase between the surface sensors and the downhole sensors at frequency $\omega_0$ is the phase of the transfer function between the bottom of the drillstring and the surface instrumentation at frequency $\omega_0$ minus $\omega_0\tau$, the phase shift due to the propagation time $\tau$. Defining $\phi_d(\omega_0)$ as the phase obtained downhole at frequency $\omega_0$, $\phi_u(\omega_0)$ as the phase obtained uphole at frequency $\omega_0$, and denoting the actual phase of the transfer function between the downhole and uphole sensors at $\omega_0$ as $\theta_u(\omega_0)$:

$\theta_u(\omega_0)=\phi_u(\omega_0)-\phi_d(\omega_0)-\omega_0\tau$.

In general, this will differ from the phase which is derived analytically. A simple correction for this error can be made as follows. Let the phase calculated analytically at $\omega$ be $\theta(\omega)$, and the corrected phase at $\omega$ be $\theta_c(\omega)$. Then $\theta_c(\omega)=\theta(\omega)+\theta_a(\omega_0)-\theta(\omega_0)$.

If the downhole phase is known at two points, then a linear correction can be made to the phase of the transfer function. A quadratic correction can be made from three measurements, and so on.

If the wave speed and depth are known from other measurements, then, if the earth is homogenous, $\tau=$(wave speed)* depth. If the earth is layered, this expression can be rewritten as $$\tau = \sum_{i=1}^{N} v_i \cdot z_i,$$

where the earth is divided into N layers of thickness $z_i$ and having velocity $v_i$.

The wave speeds may not be known, but the depth should be known. The procedure in this case is to estimate $\tau$ as the group delay of the filter between the bottom hole assembly and the surface sensors (see, e.g., "The Fourier Integral and its Applications," Athanasios Papoulis, McGraw-Hill Book Company, Inc., New York (1962) at 134):

$$\tau = \frac{d\theta(\omega)}{d\omega}.$$

Note that if $\theta(\omega)$ is only in error by a constant, this will be a very accurate estimate since the constant will drop out of the derivative (which may be taken numerically).

Finally, there are prior art methods in which it is claimed that measurements from the surface pilot sensors are unnecessary. It should be clear that the Power Spectral Seismic method can be used with such methods to improve the seismic interpretation.

In summary, the power spectral seismic concept covers any combination of elements in the first two columns of the table below with any combination of elements in the last two columns:

| Measure Power Spectrum Downhole | | Use Precision Downhole Clock | | Surface Measurements of Drillstring Motion | Measurement of Bit Noise at Earth's Surface |
|---|---|---|---|---|---|
| p-wave | Total Waveform | Tag beginning of power spectrum | | p-wave | p-wave |
| torsional wave | Upgoing Waveform | Tag time of energetic event | | Torsional wave | s-wave |
| lateral wave | Down-going Waveform | Limited time domain sample | Compress event as a wavelet | Acceleration Tool Radial Tangential Axis | |
| (further compress) Telemeter to surface | | Telemeter to surface Time Fourier Transform Phase | Wavelet Decomposition | Mud pressure | |
| | | Alternatively don't use precision clock | | Alternatively, do not use drillstring motion at surface | |

Thus, the power spectral seismic concept will improve seismic interpretation if the power spectrum is measured downhole (column 1) and the drillstring motion is measured on the surface (column 3) or the bit noise is measured at the earth's surface (column 4). Similarly, the power spectral seismic concept will improve seismic interpretation if a precision downhole clock is used (column 2) and the drillstring motion is measured on the surface (column 3) or the bit noise is measured at the earth's surface (column 4). Further, seismic interpretation will be improved if techniques from all four columns are employed.

The table also summarizes the steps that occur for each operation. Under the "Measure Power Spectrum Downhole" operation (column 1), the p-wave, torsional wave or lateral wave can be measured. For each of these, the total waveform, the upgoing waveform or the downgoing waveform can be used. Once the power spectrum is measured it is telemetered to the surface after optional compression.

Under the "Use Precision Downhole Clock" operation (column 2), the beginning of the power spectrum is tagged with the time. When an energetic event occurs it is tagged with the time and either a limited time domain sample is taken or the event is compressed as a wavelet. In either case, the time, Fourier transform phase and the wavelet decomposition are telemetered to the surface. The alternative is to not use a precision clock.

Under the "Surface Measurements of Drillstring Motion" operation (column 3), the p-wave, torsional wave, acceleration or mud pressures are measured. Acceleration is measured along the tool axis, radially or tangentially. The alternative is to not measure drillstring motion at the surface.

Under the "Measurement of Bit Noise at Earth's Surface" operation (column 4), either the p-wave or the s-wave can be measured.

The foregoing describes preferred embodiments of the invention and is given by way of example only. The invention is not limited to any of the specific features described herein, but includes all variations thereof within the scope of the appended claims.

What is claimed is:

1. A drill bit seismic system comprising
   a downhole transducer sensitive to the vibrations of a drill bit, the drill bit coupled to a drill string, the downhole transducer producing a downhole transducer signal representative of the vibrations of the drill bit;
   a downhole power spectral density processor configured to compute the downhole power spectral density of the downhole transducer signal;
   the downhole transducer and the downhole power spectral density processor being located near the drill bit during drilling operations;
   a surface transducer, coupled to the drill string substantially at the surface, sensitive to the vibrations in the drill string, the surface transducer producing a surface transducer signal representative of the vibrations in the drill string;
   a surface power spectral density processor configured to compute the surface power spectral density of the surface transducer signal; and
   a drill string transfer function magnitude estimator configured to estimate the magnitude of the transfer function of the drill string from the drill bit to the surface using the downhole power spectral density and the surface power spectral density.

2. The drill bit seismic system of claim 1, further comprising
   a transmitter configured to transmit the power spectral density; and
   a receiver configured to receive the transmitted power spectral density.

3. The drill bit seismic system of claim 1, wherein
   the drill string transfer function estimator is configured to estimate the magnitude of the drill string transfer function from the drill bit to the surface by dividing the surface power spectral density by the downhole power spectral density and taking the square root of the result.

4. The drill bit seismic system of claim 1, further comprising
   a computer configured to use the estimated magnitude of the transfer function to improve an estimate of the transfer function.

5. The drill bit seismic system of claim 1, wherein
   the downhole transducer is sensitive to upgoing compressional wave energy.

6. The drill bit seismic system of claim 1, wherein
   the downhole transducer is sensitive to upgoing torsional wave energy.

7. The drill bit seismic system of claim 1, further comprising
   a seismic energy estimator configured to use the downhole power spectral density to provide an estimate of the power spectral density of the seismic energy generated by the bit.

8. The drill bit seismic system of claim 7, wherein
   the seismic source signature estimator is configured to use the estimated seismic energy generated by the bit to improve an estimate of the seismic source signature at the bit.

9. The drill bit seismic system of claim 1, wherein the downhole power spectral density is computed for samples taken of the downhole transducer signal within a specified time window.

10. The drill bit seismic system of claim 9, wherein the specified time window has a length no greater than an update rate of drill bit seismic processing.

11. The drill bit seismic system of claim 1, wherein the downhole transducer is sensitive to compressional wave energy traveling in a drill string to which the drill bit is attached.

12. The drill bit seismic system of claim 11, further comprising one or more additional downhole transducers.

13. The drill bit seismic system of claim 12, wherein one or more of the additional downhole transducers are sensitive to compressional wave energy traveling in the drill string.

14. The drill bit seismic system of claim 13, wherein two or more downhole transducers sensitive to compressional wave energy are configured to separate compressional wave energy traveling up the drill string from that travelling down the drill string.

15. The drill bit seismic system of claim 14, wherein the power spectral density processor is configured to compute the power spectral density of the compressional wave energy traveling up the drill string detected by the additional transducers.

16. The drill bit seismic system of claim 1, further comprising a drill string transfer function phase estimator configured to estimate the phase of the transfer function of the drill string from the drill bit to the surface using the computed magnitude of the drill string transfer function.

17. The drill bit seismic system of claim 16, wherein the drill string transfer function phase estimator estimates the phase of the transfer function using the following equation:

$$\theta(\omega_0) = \frac{\omega_0}{2\pi} \int_{-\infty}^{\infty} \frac{\alpha(\omega)}{\omega^2 - \omega_0^2} d\omega;$$

where $\omega$=frequency;

$\alpha(\omega) = -\ln(|H(\omega)|)$;

$|H(\omega)|$=the magnitude of the transfer function; and $\theta(\omega_0)$=the phase of the transfer function at $\omega_0$.

18. The drill bit seismic system of claim 1 further comprising a downhole clock located near the drill bit, the downhole clock being configured to produce a downhole clock trigger and a downhole time signal representing the time the downhole clock trigger was produced;

a downhole sampler coupled to the downhole transducer signal and to the downhole clock trigger, the downhole sampler configured to take a predetermined number of downhole samples upon receipt of the downhole clock trigger;

a surface clock substantially synchronized with the downhole clock;

a surface sampler coupled to the surface transducer signal, the surface sampler configured to take surface samples of the surface transducer signal;

a phase detector coupled to the downhole samples, the downhole time signal and the downhole power spectral density, said phase detector being configured to determine a phase of the surface signal at the same frequencies at which the phase was determined downhole;

a transmitter configured to transmit the phase determined downhole and the time at which the downhole signal used in the phase calculation was measured;

a transfer function phase calculator configured to calculate the phase of the transfer function between the drill bit and the surface sensors at the selected frequencies by subtracting the phases determined at the surface from those determined downhole at each frequency.

19. The drill bit seismic system of claim 1 further comprising a downhole clock located near the drill bit, the downhole clock being configured to produce a downhole clock trigger and a time signal representing the time the downhole clock trigger was produced;

a downhole sampler coupled to the downhole transducer signal and to the downhole clock trigger, the downhole sampler configured to take a predetermined number of downhole samples upon receipt of the downhole clock trigger;

a surface clock substantially synchronized with the downhole clock;

a surface sampler coupled to the surface transducer signal, the surface sampler configured to take surface samples of the surface transducer signal;

an estimator configured to estimate the time it takes for signals to propagate from the bit to the surface sensors;

a phase detector coupled to the downhole samples, the downhole time signal and the downhole power spectral density, the phase detector being configured to determine the phase of the downhole signal at at least one frequency of interest;

a phase detector coupled to the surface clock, the surface samples and the estimator, the phase detector being configured to determine the phase of the surface signal at the same frequencies at which the phase was determined downhole;

a transfer function phase calculator configured to calculate the phase of the transfer function between the drill bit and the surface sensors at the selected frequencies as a function of the phase determined downhole, the phase determined at the surface and the estimated propagation time from the bit to the surface sensors.

20. The drill bit seismic system of claim 19 in which the estimator comprises a calculator configured to calculate the group delay from the magnitude of the transfer function between the downhole sensors and the surface sensors.

21. A drill bit seismic system comprising a drill bit coupled to a drill string;

a drill string transfer function estimator configured to estimate a drill string transfer function magnitude by computing a downhole power spectral density of a signal representative of the vibrations of the drill bit and a surface power spectral density of a signal representative of the vibrations of the drill string substantially at the surface;

a lateral motion transducer coupled to the drill string near the drill bit, the lateral motion transducer being sensitive to lateral motion of the drill bit, the lateral motion transducer producing a lateral motion transducer signal;

the lateral motion transducer signal being coupled to the drill string transfer function estimator; and the drill string transfer function estimator being configured to filter the effects of the lateral motion of the drill bit on the estimate of the transfer function of the drill string.

22. The drill bit seismic system of claim 21 wherein the drill string transfer function estimator is configured to stop estimating the transfer function of the drill string when the lateral motion transducer signal is greater than a predetermined amount.

23. A method for using drill bit vibration spectral density in a drill bit seismics system comprising sensing drill bit vibrations;

computing the drill bit power spectral density of the sensed drill bit vibrations;

sensing vibrations in the drill string at the surface;

computing the surface power spectral density of the sensed drill string vibrations; and estimating a transfer function of the drill string using the drill bit power spectral density and the surface power spectral density.

24. The method of claim 23 further comprising estimating the phase of the transfer function of the drill string using a downhole clock and a surface clock substantially synchronized with the downhole clock.

* * * * *